US00RE40847E

(19) United States
(12) Reissued Patent
Vanmaele et al.

(10) Patent Number: US RE40,847 E
(45) Date of Reissued Patent: Jul. 14, 2009

(54) INK COMPOSITIONS FOR INK JET PRINTING

(75) Inventors: Luc Vanmaele, Lochristi (BE); Emiel Verdonck, Berlaar (BE)

(73) Assignee: Agfa-Gevaert, Mortsel (BE)

(21) Appl. No.: 10/392,495

(22) Filed: Mar. 19, 2003

Related U.S. Patent Documents

Reissue of:
(64) Patent No.: 6,310,115
Issued: Oct. 30, 2001
Appl. No.: 09/396,867
Filed: Sep. 15, 1999

U.S. Applications:
(60) Provisional application No. 60/113,339, filed on Dec. 22, 1998.

(30) Foreign Application Priority Data

Oct. 29, 1998 (EP) ..... 98203630

(51) Int. Cl.
*C09D 11/10* (2006.01)
*G08G 65/333* (2006.01)
*C08G 65/00* (2006.01)

(52) U.S. Cl. ..... 427/466; 522/14; 522/25; 522/26; 522/31; 522/75; 522/81; 522/79; 522/84; 522/170; 522/173; 522/176; 522/179; 522/181; 522/182; 106/20 B; 106/31.13; 106/31.24; 523/160

(58) Field of Classification Search ..... 427/466; 522/14, 25, 26, 31, 75, 81, 83, 79, 84, 170, 522/173, 176, 179, 181, 182, 34; 523/160; 106/20 B, 31.13, 31.24
See application file for complete search history.

(56) References Cited

U.S. PATENT DOCUMENTS 2,692,256 A 10/1954 Bauer et al. ..... 260/86.1
4,303,924 A 12/1981 Young, Jr. ..... 346/1.1
4,577,205 A * 3/1986 Shibata et al.
5,266,106 A * 11/1993 Breton
5,275,646 A 1/1994 Marshall et al. ..... 106/20 B
5,596,027 A * 1/1997 Mead et al.
5,641,346 A * 6/1997 Mantell et al.
5,889,084 A * 3/1999 Roth
5,897,695 A * 4/1999 Mayo et al.
6,187,897 B1 * 2/2001 Kawashima et al.

FOREIGN PATENT DOCUMENTS

| | | |
|---|---|---|
| EP | 0 106 628 | 4/1984 |
| EP | 0 187 045 | 7/1986 |
| EP | 0 511 860 | 11/1992 |
| EP | 0 997 507 A1 * | 5/2000 |
| GB | 2256874 | 12/1992 |
| JP | 9183927 | 7/1997 |
| JP | 9-183927 | 7/1997 |
| JP | 9183928 | 7/1997 |

OTHER PUBLICATIONS

Joginder et al., Journal of Polymer Science, vol. XLIV, 523–529 (1960).
Memo from Nobu Tominaga to Dr. Luc Vanmaele dated Jul. 25, 2003.
Product Data Sheet, Epikote™ Resin 828, Resolution Performance Products, Oct. 2004.
RadTech Japan Annual Report No. 12, Oct. 1997 to Sep. 1998, Nov. 6, 1998, Dainippon Ink & Chemicals, Inc., Partial Translation Included.
Volume III, Photoinitiators for Free Radical Cationic & Anionic Photopolymerisation, 2nd Edition, J.V. Crivello & K. Diekliker, 1998 Sita Technology Ltd., p. 245.

* cited by examiner

*Primary Examiner*—Susan W Berman
(74) *Attorney, Agent, or Firm*—Joseph T. Guy; Nexsen Pruet, LLC

(57) ABSTRACT

Radiation curable ink compositions for ink jet contain radiation curable monomers containing vinylether and acrylate functions.

11 Claims, No Drawings

INK COMPOSITIONS FOR INK JET PRINTING

Matter enclosed in heavy brackets [ ] appears in the original patent but forms no part of this reissue specification; matter printed in italics indicates the additions made by reissue.

This application *is a REI of Ser. No. 09/396,867 filed Sep. 15, 1999, now U.S. Pat. No. 6,310,115, which* claims the benefit of U.S. Provisional Application No. 60/113,339 filed Dec. 22, 1998, *which is expired.*

FIELD OF THE INVENTION

The present invention relates to ink compositions for ink jet printing containing a particular type of radiation curable compounds.

BACKGROUND OF THE INVENTION

In the majority of applications printing proceeds by pressure contact of an ink-loaden printing form with an ink-receiving material which is usually plain paper. The most frequently used impact printing technique is known as lithographic printing based on the selective acceptance of oleophilic ink on a suitable receptor.

In recent times however so-called non-impact printing systems have replaced classical pressure-contact printing to some extent for specific applications. A survey is given e.g. in the book "Principles of Non Impact Printing" by Jerome L. Johnson (1986), Palatino Press, Irvine, Calif. 92715, USA.

Among non-impact printing techniques ink jet printing has become a popular technique because of its simplicity, convenience and low cost. Especially in those instances where a limited edition of the printed matter is needed ink jet printing has become a technology of choice. A recent survey on progress and trends in ink jet printing technology is given by Hue P. Le in Journal of Imaging Science and Technology Vol. 42 (1), January/February 1998, which is hereby included as reference.

In ink jet printing tiny drops of ink fluid are projected directly onto an ink receptor surface without physical contact between the printing device and the receptor. The printing device stores the printing data electronically and controls a mechanism for ejecting the drops image-wise. Printing is accomplished by moving the print head across the paper or vice versa. Early patents on ink jet printers include U.S. Pat. No. 3,739,393, U.S. Pat. No. 3,805,273 and U.S. Pat. No. 3,891,121.

The jetting of the ink droplets can be performed in several different ways. In a first type of process a continuous droplet stream is created by applying a pressure wave pattern. This process is known as continuous ink jet printing. In a first embodiment the droplet stream is divided into droplets that are electrostatically charged, deflected and recollected, and into droplets that remain uncharged, continue their way undeflected, and form the image. Alternatively, the charged deflected stream forms the image and the uncharged undeflected jet is recollected. In this variant of continuous ink jet printing several jets are deflected to a different degree and thus record the image (multideflection system).

According to a second process the ink droplets can be created "on demand" ("DOD" or "drop on demand" method) whereby the printing device ejects the droplets only when they are used in imaging on a receiver thereby avoiding the complexity of drop charging, deflection hardware, and ink recollection. In drop-on-demand the ink droplet can be formed by means of a pressure wave created by a mechanical motion of a piezoelectric transducer (so-called "piezo method"), or by means of discrete thermal pushes (so-called "bubble jet" method, or "thermal jet" method).

Ink compositions for ink jet typically include following ingredients: dyes or pigments, water and/or organic solvents, humectants such as glycols, detergents, thickeners, polymeric binders, preservatives, etc. It will be readily understood that the optimal composition of such an ink is dependent on the ink jetting method used and on the nature of the substrate to be printed. The ink compositions can be roughly divided in:

water based: the drying mechanism involves absorption, penetration and evaporation;

oil based: the drying involves absorption and penetration;

solvent based: the drying mechanism involves primarely evaporation;

hot melt or phase change: the ink vehicle is liquid at the ejection temperature but solid at room temperature; drying is replaced by solidification;

UV-curable: drying is replaced by polymerization.

It will be readily understood that the first two types of ink compositions require a receiving medium that is more or less absorptive. On the contrary, for non-absorbent substrates solvent based inks, hot melt inks or UV-curable inks will be better suited.

Early patents on water-based inks include U.S. Pat. No. 3,903,034, U.S. Pat. No. 3,889,269, U.S. Pat. No. 3,870,528, U.S. Pat. No. 3,846,141, U.S. Pat. No. 3,776,742 and U.S. Pat. No. 3,705,043. however, it was recognized early that systems based on water-based inks suffer from a number of disadvantages such as: (a) they require water evaporation and therefore an extensive drying system, especially when printing speed is important; (b) large printed areas tend to cockle, (c) the images are sensitive to wet and dry rubbing, (d) inks of low viscosity tend to tip dry on the orifice which can be avoided by the use of humectants, usally glycols, which then increase viscosity. The use of polar solvent based inks can overcome some of the problems inherent to water-based inks, but in its turn causes other problems such as the possible generation of toxic or inflammable vapours. Therefore efforts were conducted to the development of low-solvent ink compositions. In this research the concept of UV-curable ink compositions was generated, of which a survey is given hereinafter.

An important basic patent on ink compositions for ink jet, satisfying the need for a low solvent content, and containing a UV-curable compound is U.S. Pat. No. 4,303,924. It describes an ink jet printing process using charged droplets wherein the ink composition contains (a) a multifunctional unsaturated UV-curable compound, (b) a monofunctional unsaturated compound, (c) a reactive synergist, (d) a colorant, (e) an oil soluble salt for conductivity, (f) a photoinitiator, and (g) an organic polar solvent, preferably in a small amount. Several examples of monomers containing acrylate, epoxy, and vinyl functional groups are disclosed.

In EP 0 071 345 a jet ink composition is claimed comprising (a) a cationically polymerizable epoxy resin chosen from particular classes, (b) a photoinitiator, (c) a colorant, (d) a blend of organic solvents.

In U.S. Pat. No. 4,680,368 a UV-curable ink, not limited to ink jet, is disclosed comprising (A) a poly(urethane(meth) acrylate), (B) a radically polymerizable compound and (C) a photoinitiator.

According to U.S. Pat. No. 4,978,969 the ink composition comprises 12–80% of a UV curable adhesive, 3–10% of a pigment, and 10–40% of a solvent.

In EP 0 456 039 B1 an ink composition for ink jet is disclosed that is free of volatile organic solvent and contains a colorant, a polar conductive compound, and one or more monomers. In the analogous EP 0 540 203 B1 a non-conductive ink composition, free of volatile solvent, is disclosed, said composition again comprising one or more monomers and a colorant.

In U.S. Pat. No. 5,270,368 the ink composition contains at least two acrylate types, being an aromatic acrylate with carboxyl groups, and an epoxy acrylate.

According to EP 0 658 607 an aqueous ink contains a pigment, a water-soluble resin for dispersing the pigment, a water-soluble Uv-curable monomer and a photoinitiator.

In U.S. Pat. No. 5,623,001 an ink is described comprising (a) 20–75% water, (b) a water-mixable UV-curable compound, preferably an acrylate oligomer, (c) a photoinitiator and (d) a colorant.

According to U.S. Pat. No. 5,641,346 the ink jet ink contains a colorant, a liquid phase comprising water, and an epoxy compound and/or a vinyl ether compound.

In WO 97/31071 a radiation-curable ink jet composition is described comprising from 80% to 95% of a polyfunctional (poly)alkoxylated acrylate monomer.

Summarizing, a radiation curable ink compositions may in general contain one or more radiation curable prepolymers, or oligomers, radiation curable monomers or reactive diluents, optionally one or more photoinitiators, colorants, and other additives. Although polymerizable monomers are in principle suited for achieving low viscosity, needed in ink jet printing, without introducing a significant amount of water or other solvent, it is a problem to find monomers that are suited for use both in free radically and cationically radiation curable inks.

The present invention extends the teachings on radiation curable ink compositions for ink jet.

OBJECTS OF THE INVENTION

It is an object of the present invention to provide new radiation curable compounds for radiation curable inks.

It is another object of the present invention to provide new reactive diluents for radiation curable inks.

It is a further object of the present invention to provide ink compositions for ink jet printing containing these new compounds.

These and other objects of the invention will become apparent from the description hereinafter.

SUMMARY OF THE INVENTION

The above mentioned objects are realized by providing an ink composition containing a radiation-curable monomer represented by the following general formula I:

(I)

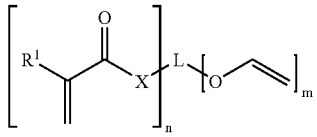

wherein, $R^1$ represents hydrogen, or a substituted or unsubstituted alkyl group, preferably methyl, L represents a linking group, X represents O, S or $NR^2$ wherein $R^2$ has the same meaning as $R^1$; when $X=NR^2$, L and $R^2$ may form together a ring system, n and m independently represent a value from 1 to 5.

DETAILED DESCRIPTION OF THE INVENTION

Representative examples of compounds corresponding to general formula I are listed in the following table 1 without being limited thereto.

TABLE 1

| | |
|---|---|
| 1.1 | 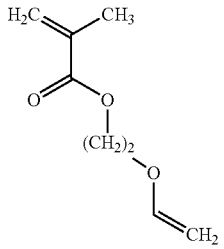 |
| 1.2 | 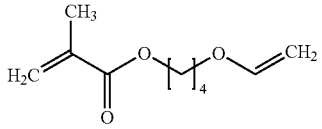 |
| 1.3 | 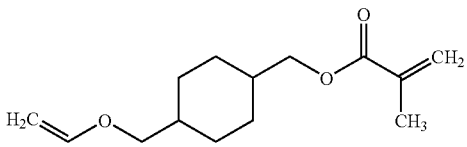 |

TABLE 1-continued
1.4
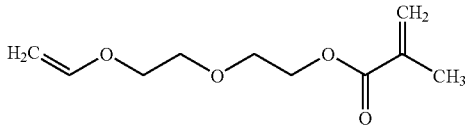
1.5
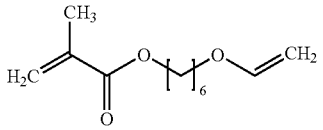
1.6
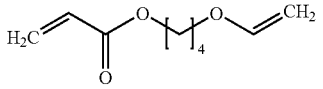
1.7
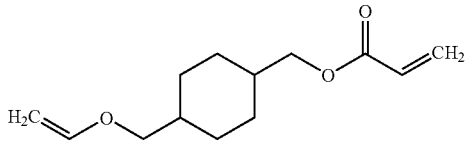
1.8
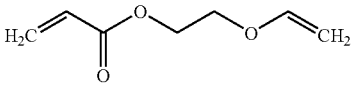
1.9
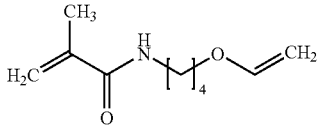
1.10
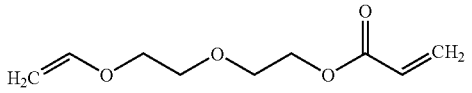
1.11
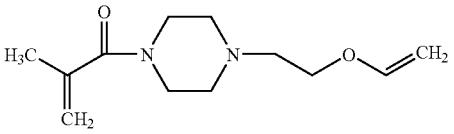
1.12
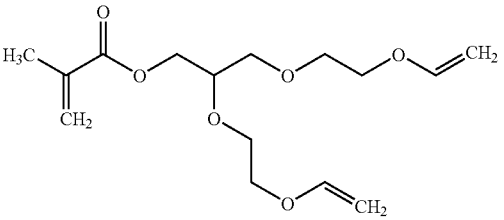
1.13
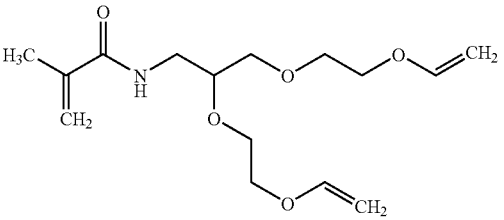

TABLE 1-continued
1.14
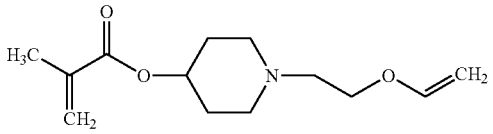
1.15
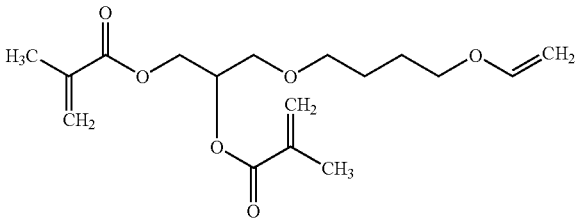
1.16
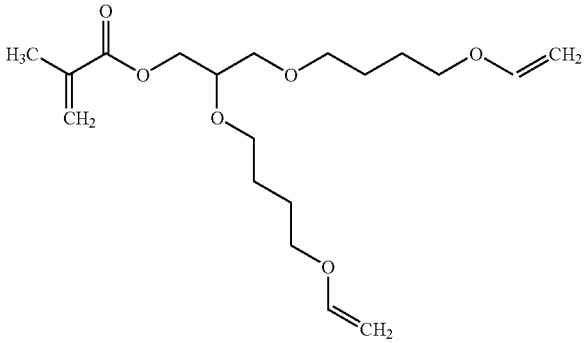
1.17
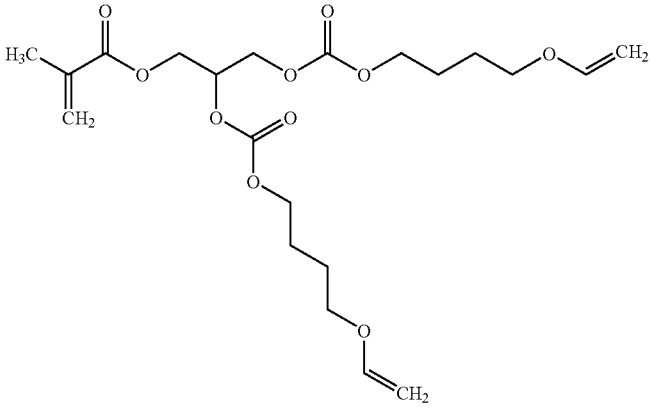
1.18
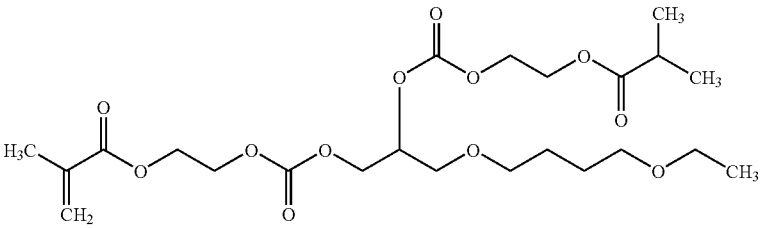

TABLE 1-continued
1.19
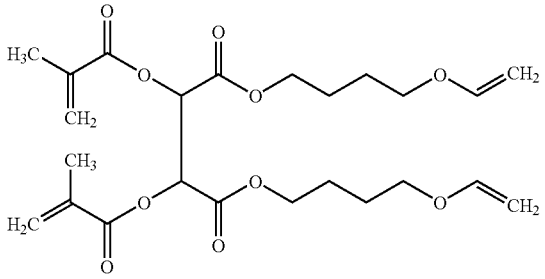
1.20
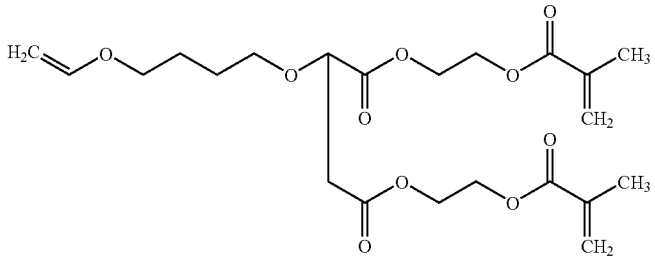
1.21
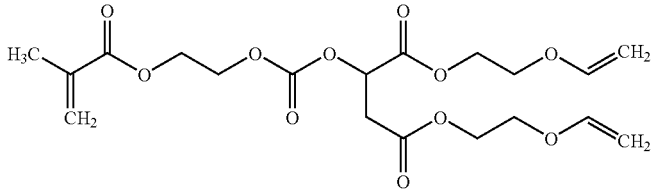
1.22
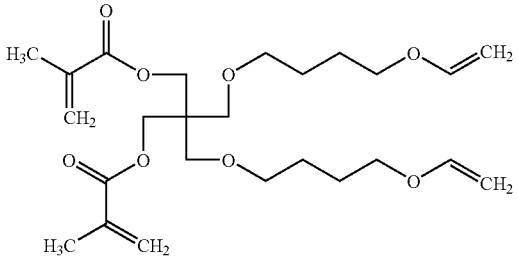
1.23
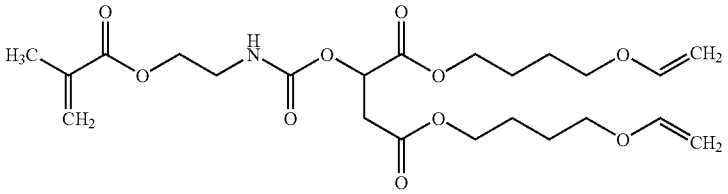
1.24
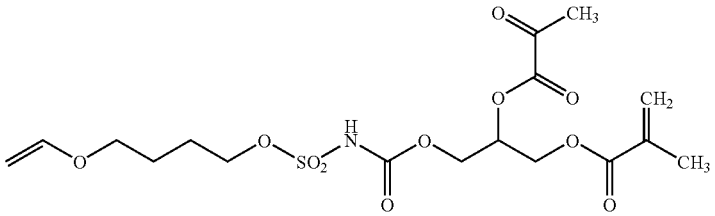

TABLE 1-continued 1.25

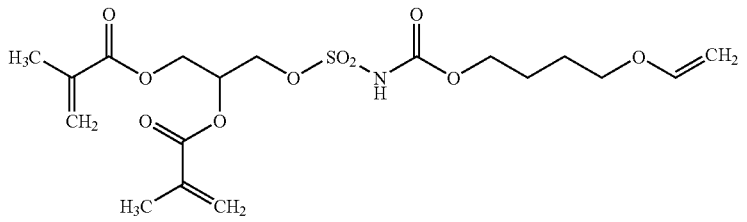

1.26

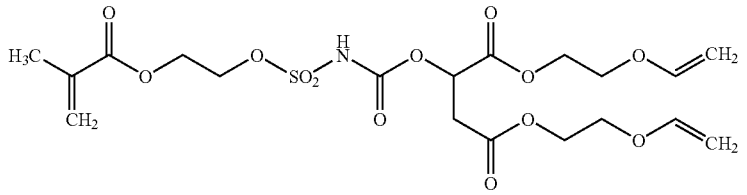

The compounds of table 1 can be prepared according to standard synthetic methods known to those skilled in the art of organic synthesis. A possible pathway is depicted in the following scheme 1.

Scheme 1

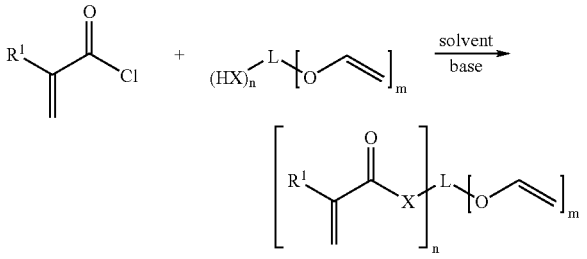

An actual preparative example is given furtheron.

We will now describe systematically the principal other ingredients of the ink composition according to the invention.

Initiators

In a preferred embodiment, the initiator is a photoinitiator. The photoinitiators can be divided in compounds that are suited for cationic polymerization and compounds suited for free radical polymerization.

References on photoinitiators include following: P. K. T. Oldring (ed.), "Chemistry and Technology of UV and EB Formulation for Coatings, Inks and Paints: Vol. 3 Photoinitiators for Free Radical and Cationic Polymerization," SITA Technology Ltd., London, UK (1991); N. S. Allen, "Photoinitiators for UV and visible curing of coatings; mechanism and properties", Journal of Photochemistry and Photobiology, A: Chemistry 100 (1996) 101–107; J. V. Koleske, "A radiation-cure primer", Journal of Coatings Technology, Vol69, No. 866, March 1997, 29–38.

Disclosures specific on photoinitiators for cationic polymerisation include: J. V. Crivello, "The Chemistry of Photoacid Generating Compounds", Proceedings of the ACS Division of Polymeric Materials: Science and Engineering, Vol. 61, pages 62–66, (1989); J. V. Crivello and J. H. W. Lam, "Complex Triarylsulfonium Salt Photoinitiators I. The Identification, Characterization, and Synthesis of a New Class of Triarylsulfonium Salt Photoinitiators," Journal of Polymer Science, Polymer Chemistry Edition, Vol. 18, 2677–2695 (1980); J. V. Crivello and J. H. W. Lam, "Complex Triarylsulfonium Photoinitiators II. The Preparation of Several New Complex Triarylsulfonium salts and the Influence of Their Structure in Photoinitiated Cationic Polymerization," Journal of Polymer Science, Polymer Chemistry Edition, Vol. 18, pages 2697–2714 (1980); J. V. Crivello and J. H. W. Lam, "Diaryliodonium Salts A New Class of Photoinitiators for Cationic Polymerization," Macromolecules, Vol. 10, pages 1307–1315 (1977); and J. V. Crivello, J. L. Lee and D. A. Conlon, "Developments in the Design and Applications of Novel Thermal and Photochemical Initiators for Cationic Polymerization", Makromol. Chem. Macromolecular Symposium, Vol. 13/14, pages 134–160 (1988).

Particularly preferred are the diaryl iodonium salts and their derivatives, the triaryl sulfonium salts and their derivatives, and the triphenyl phosphonium salts and their derivatives, with examples of alkyl and aryl substituents. Very recently, there have been described new types of photoinitiators for cationic polymerization such as triarylsulphonium-tetrakis(pentafluorophenyl)-borate (RHODORSIL 2074, Rhône-Poulenc Chimie), by C. Priou et al. in the Conference Proceedings of Radtech Europe '97, p. 314, and such as onium salts with specific light absorption characteristics in WO 97/47660 (Nippon Kayaky KK).

Useful photoinitiators for free radical polymerization are e.g. LUCIRIN LR8953 (ex BASF), IRGACURE 819 and 907 (ex Ciba-Geigy), DAROCUR 4865 (ex Ciba-Geigy), and isopropylthioxanthones, e.g. QUANTACURE ITX (ex Rahn AG). Other useful photoinitiators for free radical polymerization are polymeric oligomeric, respectively copolymerizable photoinitiators such as discussed by M. Visconti et al. respectively W. Davies et al. in the Conference papers 6, respectively 7, of the Radcure Coatings and Inks, Curing and Performance Conference (Harrogate, 22–23 June 1998). Such photoinitiators are e.g. ESACURE KIP150, ESACURE KT 37 and KT 55 (ex Lamberti), and acrylated IRGACURE 2959 or IRGACURE 2959 modified melamine acrylate (ex Ackros Chemicals).

Additional examples of suitable initiators are disclosed in following patents: U.S. Pat. Nos. 4,683,317, 4,378,277, 4,279,717, 4,480,368, 4,443,495, 4,303,924, 4,751,102, 4,334,970, 5,270,368, 5,395,724, and EP 0 540 203, EP 0 568 607 and EP 0 659 039.

All disclosures cited are totally incorporated herein by reference.

Sometimes, it is also desirable to include, as well as a primary photoinitiator, a co-initiator, also called initiator synergist which is preferably of the amine type, e.g. the aminobenzoate type. The latter types of co-initiators are generally being used with the benzophenone or xanthone/thioxanthone types of primary photoinitiator. More examples can be found in the Oldring reference cited above.

The photoinitiator and occasionally the coinitiator are preferably present in an amount from 0.2 to 20 % by weight and most preferably between 1 and 10 %.

Colorants

Inks of the present invention preferably contain a colorant. Any colorant may be used to impart the desired color to the ink. In embodiments of the present invention the colorant may include at least one pigment, one dye, or a combination thereof.

A wide variety of organic and inorganic dyes and pigments, alone or in combination may be selected for use in the ink compositions of this invention. The pigment particles should be sufficiently small to permit free flow of the ink through the ink jet printing device, especially at the ejecting nozzles that usually have a diameter ranging from 10 μm to 50 μm. The pigment particle size also has an influence on the pigment dispersion stability, which is critical throughout the life of the ink. It is also desirable to use small particles for maximum color strength.

Accordingly, the average particle diameter may be from about 0.005 μm to about 15 μm. Preferably, the pigment particle size may range from about 0.005 to about 5 microns, more preferably from about 0.005 to about 1 μm, and most preferably from about 0.005 to about 0.3 μm. Pigment particle sizes outside these ranges may, of course, be used as long as the objectives of the present invention are achieved.

Very fine dispersions of pigments and methods for their preparation are disclosed in e.g. EP 0 776 952, U.S. Pat. No. 5,538,548, U.S. Pat. No. 5,443,628, EP 0 259 130, U.S. Pat. No. 5,285,064, EP 0 429 828, and EP 0 526 198.

The pigment can be black, cyan, magenta, yellow, red, blue, green, brown, mixtures thereof, and the like. For example, suitable pigment materials include carbon blacks such as Regal 400R, Mogul L, Elftex 320 from Cabot Colo., or Carbon Black FW18, Special Black 250, Special Black 350, Special Black 550, Printex 25, Printex 35, Printex 55, Printex 150T from Degussa Co., and Pigment Black 7. Additional examples of suitable pigments are disclosed in, for example, U.S. Pat. No. 5,389,133, to Gundlach et al., the entire disclosure of which is incorporated herein by reference.

Suitable pigments include, for instance, C. I. Pigment Yellow 17, C. I. Pigment Blue 27, C. I. Pigment Red 49:2, C. I. Pigment Red 81:1, C. I. Pigment Red 81:3, C. I. Pigment Red 81:x, C. I. Pigment Yellow 83, C. I. Pigment Red 57:1, C. I. Pigment Red 49:1, C. I. Pigment Violet 23, C. I. Pigment Green 7, C. I. Pigment Blue 61, C. I. Pigment Red 48:1, C. I. Pigment Red 52:1, C. I. Pigment Violet 1, C. I. Pigment White 6, C. I. Pigment Blue 15, C. I. Pigment Yellow 12, C. I. Pigment Blue 56, C. I. Pigment Orange 5, C. I. Pigment Black 7, C. I. Pigment Yellow 14, C. I. Pigment Red 48:2, C. I. Pigment Blue 15:3, C. I. Pigment Yellow 1, C. I. Pigment Yellow 3, C. I. Pigment Yellow 13, C. I. Pigment Orange 16, C. I. Pigment Yellow 55, C. I. Pigment Red 41, C. I. Pigment Orange 34, C. I. Pigment Blue 62, C. I. Pigment Red 22, C. I. Pigment Red 170, C. I. Pigment Red 88, C. I. Pigment Yellow 151, C. I. Pigment Red 184, C. I. Pigment Blue 1:2, C. I. Pigment Red 3, C. I. Pigment Blue 15:1, C.I. Pigment Blue 15:3, C.I. Pigment Blue 15:4, C. I. Pigment Red 23, C. I. Pigment Red 112, C. I. Pigment Yellow 126, C. I. Pigment Red 169, C. I. Pigment Orange 13, C. I. Pigment Red 1-10, 12, C.I. Pigment Blue 1:X, C.I. Pigment Yellow 42, C.I. Pigment Red 101, C.I. Pigment Brown 6, C. I. Pigment Brown 7, C. I. Pigment Brown 7:X, C. I. Pigment Black 11, C. I. Pigment Metal 1, C. I. Pigment Metal 2, C.I. Pigment Yellow 128, C.I. Pigment Yellow 93, C.I. Pigment Yellow 74, C.I. Pigment Yellow 138, C.I. Pigment Yellow 139, C.I. Pigment Yellow 154, C. I. Pigment Yellow 185, C.I. Pigment Yellow 180, C.I. Pigment Red 122, C.I. Pigment Red 184, and bridged aluminum phtalocyanine pigments.

Furtheron the pigment may be chosen from those disclosed in Industrial Organic Pigments, Production, Properties, Applications, second edition, W. Herbst, K. Hunger; VCH, 1997.

Most preferred pigments are Pigment Yellow 128, 93, 17, 74, 138, 139, 154, 185, 180; Pigment Red 122, 57:1, 184; Pigment Blue 15:3, 15:4, and carbon black.

The pigment may, but need not, be in the form of a dispersion comprising a dispersant also called pigment stabilizer. The latter may be, for example, of the polyester, polyurethane of polyacrylate type, especially in the form of high molecular weight block copolymer, and would typically be incorporated at 2.5% to 100% by weight of the pigment. Suitable examples are DISPERBYK (ex BYK Chemie) or SOLSPERSE (ex Zeneca) dispersants. A detailed list of non-polymeric as well as some polymeric dispersants appears in, for example, McCutcheon's Functional Materials, North American Edition, Manufacturing Confectioner Publishing Co., Glen Rock, N.J., pp. 110–129 (1990), the entire disclosure of which is incorporated herein by reference.

Other pigment stabilizers are disclosed in DE 19636382, U.S. Pat. No. 5,720,802, U.S. Pat. No. 5,713,993, PCT/GB95/02501, U.S. Pat. No. 5,085,689 and GB 2303376.

The pigment or dye may be present in the ink composition in any effective amount, generally from about 0.5 to about 20 percent by weight of the ink.

Other Monomers, Oligomers or Reactive Diluents usable in Combination with the Invention Monomers A wide variety of photopolymerisable and photocrosslinkable compounds can be used in combination with the monomers of the present invention.

Suitable monomers include e.g. the monomers disclosed in DE-OS Nos. 4005231, 3516256, 3516257, 3632657 and U.S. Pat. No. 4,629,676, and WO 97/31071.

The photopolymerizable composition may also comprise polymers, prepolymers and/or oligomers and/or reactive diluents comprising one or more polymerizable functions.

Suitable prepolymers and reactive diluents for use in radiation curable compositions such as the ink composition of the present invention may be selected from the group consisting of unsaturated urethane(meth)acrylates, epoxy (meth)acrylates, polyolacrylates, polyether(meth)acrylates and polyester(meth)acrylates as described e.g. in "Chemistry & Technology of UV and EB formulation for coatings, inks and paints" Vol.2: Prepolymers and Reactive diluents for UV and EB curable formulations." Ed. G. WEBSTER-SITA Technology—London (1996).

A survey of UV-curable coating compositions is given e.g. in the periodical "Coating" 9/88, p. 348–353.

Other usable prepolymers and oligomers belong to the class of aliphatic and aromatic polyester-urethane acrylates. The structure of polyester-urethane acrylates is given in the booklet "Radiation Cured Coatings" by John R. Constanza, A. P. Silveri and Joseph A. Vona, published by Federation of Societies for Coatings Technology, 1315 Walnut St. Philadelphia, Pa. 19107 USA (June 1986) p. 9.

It will be clear that all these cited monomers, prepolymers, polymers and oligomers can be used in admixture.

A preferred second oligomer used in combination with a monomer of the present invention is an amino modified polyether acrylate known as CN 501 from Cray Valley Colo.

In a particular embodiment the second monomer, oligomer or prepolymer not belonging to the invention is the principal compound involved in the radiation curing, and the monomer according to the invention functions as so-called "reactive diluent" in order to reduce the viscosity of the final ink formulation.

Other Additives

Inks of the present invention may include additives such as biocides, buffering agents, anti-mold agents, pH adjustment agents, electric conductivity adjustment agents, chelating agents, anti-rusting agents, polymerisation inhibitors, light stabilizers, and the like. Such additives may be included in the ink jet inks of the present invention in any effective amount, as desired.

Examples of pH controlling agents suitable for inks of the present invention include, but are not limited to, acids; bases, including hydroxides of alkali metals such as lithium hydroxide, sodium hydroxide and potassium hydroxide. The amount included will depend, of course, on the specific component being included.

Furtheron, the ink composition of the present invention may also comprise surfactants and photoinitiator stabilizers. Suitable photoinitiator stabilizers include those disclosed in EP 0 465 039. Suitable surfactants are preferably of the nonionic type, for example FLUORAD FC430 (ex 3M Corp.). Such surfactants when present are preferably included in an amount of 0.1% to 10% by weight of the total composition.

Compositions according to the present invention may contain organic solvents, such as alcohols, fluorinated solvents and dipolar aprotic solvents. Preferably methanol, ethanol, propanol, 1-butanol, 1-pentanol, 2-butanol, t-butanol, glycol, glycolethers, N-methylpyrrolidone, N,N-dimethylacetamid, N, N-dimethylformamid, 2,4-pentanedione and hexafluoroaceton are used.

The ink compositions of the present invention may further comprise a dendrimer.

Dendrimers are radially symmetrical molecules of a STARBURST.TM. topology comprised of an initiator core, such as nitrogen, ethyleneimine, and the like, interior layers attached to the core and comprised of a suitable number of arms, for instance, two to four arms, each arm being comprised of repeating units with the number of repeating units in each arm being considered the generation of the dendrimer, and terminal groups functionality, such as, for example, a primary amine attached to the outmost generation, which dendrimers are illustrated, for example, in U.S. Pat. Nos. 4,507,466; 4,631,337, 4,558,120, 4,568,737, and 4,587,329, and in Tomalia et al., Angewandte Chemie, Int. Ed. Engl. 29, 138 (1990). The size and shape of the STARBURST.TM. dendrimer molecule and the functional groups present in the dendrimer molecule can be controlled by the choice of the initiator core, the number of generations, and the choice of repeating units employed at each generation.

The choice of the dendrimer components can affect the properties of the dendrimers. The initiator core type can affect the dendrimer shape producing, for example, spheroid-shaped dendrimers, cylindrical- or rod-shaped dendrimers, or ellipsoid-shaped dendrimers. Sequential building of generations determines the dimensions of the dendrimers and the nature of its interior. Examples of suitable core materials include ammonia, polyfunctional alcohols, such as pentaerythritol or tris-(hydroxymethyl) ethane, 1,1,1-tris-(4'-hydroxyphenyl)ethane, polyfunctional amines, such as ethylene diamine, linear polyethyleneimines, and the like. The chemical functionality of the repeating unit in the interior layers can include, for example, amidoamines, such as aminoethyl acetamide, imines, such as diethylene diimine, or ethers like those obtained from materials such as, for example, 3,5-dihydroxyethyl benzyl alcohol. The terminal functionalities include, for example, amino groups, hydroxyl groups, carboxylic acid groups, carboxylates, esters, amides, phosphates, sulfonates, and the like. The synthesis of dendrimers usually occurs by a divergent approach that involves the initial reaction of a monomer with the initiator core, followed by exhaustive reaction of the resulting functional groups with a difunctional compound, such as a diamine, including, for example, ethylene diamine, to afford the next generation of reactive amino groups. Thus, for example, ethylene diamine can be suitably reacted first with methyl acrylate to produce a compound such as N,N,N',N'-tetra (methyoxycarbonylethyl)ethylene diamine. The aforesaid compound can be reacted in the next step with ethylene diamine to produce an amidoamine dendrimer having a generation number of zero, a molecular weight of 517, and four primary amino groups at the surface. Repetition of the above two-step procedure leads to subsequent generations.

An alternate synthetic route uses a convergent growth synthesis as described in detail in Hawker et al., J. Amer. Chem. Soc., 112, 7368 (1990).

The dendrimer may have other groups or segments, in addition to amino groups. For instance, the dendrimer may have a dye covalently attached to it, or it may have certain functional groups grafted onto it.

The dendrimers may be grated with, for example, alkylene oxide oligomers or polymers, wherein the alkylene has 1–12 carbon atoms and the degree of polymerization of the alkylene oxide is in the range of from about 2 to about 100. The amount of grafting can be in any suitable range, preferably below 50% of the amino groups, and even more preferably below 10% of the amino groups. Grafting of ethylene oxide on the dendrimer can be performed by any suitable means known to those of ordinary skill in the art. For instance, a polyethylene glycol monomethyl ether of suitable molecular weight can be converted to polyethylene glycol monomethyl ether p-toluene sulfonate by suitably reacting with p-toluenesulfonyl chloride and pyridine, and the sulfonate then reacted with the dendrimer under suitable conditions, as known to those of ordinary skill in the art. Grafted dendrimers can also be obtained from Dendritech, Inc. in Midland, Mich.

Preferred dendrimers for use in the preparation of the ink composition of the present invention include those having terminal amine functionality at the surface. It is further preferred that the dendrimer has a molecular weight in the range from about 300 to about 100,000, a generation number of from 0 to 10, a surface amine group concentration of from about 3 to about 4,100, and a molecular diameter of from about 1 nm to about 1000 nm. More preferred dendrimers are those having terminal primary amine functionality. It is also more preferred that the dendrimer has a molecular weight in the range from about 500 to about 30,000, a generation number of from 0 to about 5, a surface group concentration of from about 4 to about 150, and a molecular diameter of from about 1 nm to about 150 nm. It is also preferred that the polydispersity index (Mw/Mn) of the dendrimer is low, preferably in the range of from about 1.1000 to about 1.0001, and more preferably in the range of from about 1.001 to about 1.0001. Examples of dendrimers prepared by the divergent approach include the STARBURST.TM. dendrimers available from Dendritech, Inc. These dendrimers from Dendritech, Inc. are polyamidoamines (PAMAMs) having primary amine terminal surface functionality, and made of ethylene diamine core and sequenced copolymers of ethylene diamine and methyl acrylate. They have a polydispersity index of 1.0007.

The dendrimer is present in the ink composition in an amount sufficient to provide sufficient adhesion of the ink components to the printing surface, and also to provide sufficient water resistance and cold and hot humidity resistance. The amount of the dendrimer is preferably in the range of from about 0.1% to about 10% by weight, more preferably in the range of from about 0.5% to about 2% by weight, and even more preferably in the range of from about 1% by weight to about 2% by weight of the ink composition.

In formulating the final ink jet ink compositions of the present invention, certain physical properties should be satisfied. For example, ink compositions for use in ink jet recording processes should have appropriate viscosity and surface tension characteristics. In the present invention, it is preferred that the ink jet ink composition has a viscosity of from about 1 to about 50 mPa.s at 25° C. The surface tension is preferably from 20 to 72 mN/m and most preferably from 20 to 60 mN/m.

Apparatuses for radiation curing are known to those skilled in the art and are commercially available. For example, the curing proceeds with medium pressure mercury vapour lamps with or without electrodes, or pulsed xenon lamps. These ultraviolet sources usually are equipped with a cooling installation, an installation to remove the produced ozone and optionally a nitrogen inflow to exclude air from the surface of the product to be cured during radiation processing. An intensity of 40 to 240 W/cm in the 200–400 nm region is usually employed. An example of a commercially available ultraviolet medium-pressure electrodeless mercury vapour lamp is the model. VPS/I600 curing system of Fusion UV systems Ltd., UK. A pulsed xenon flash lamp is commercially available from IST Strahlentechnik GmbH. Nürtingen, Germany. Using the Fusion model one has also the possibility to use metal halide doped Hg vapour or XeCl excimer lamps, each with its specific UV emission spectrum. This permits a higher degree of freedom in formulating the curing composition: a more efficient curing is possible using the lamp with the most appropriate spectral characteristics.

High energy ionizing radiation such as X-rays, gamma rays, beta rays and accelerated electrons can also be used to accomplish curing of the ink composition.

The ink jet receiver materials to which the ink composition of the present invention can be jetted are not limited and include e.g. paper, coated paper, polyolefin coated paper, cardboard, wood, composite boards, plastic, coated plastic, canvas, textile, metal and ceramics.

The present invention will now be illustrated by the following examples without however being limited thereto.

EXAMPLES

Preparative Example

Synthesis of 4-(vinyloxy)butylmethacrylate (compound I-2).

A solution of 200 ml methacryloylchloride in 500 ml of dry ethyl acetate was added dropwise over 120 minutes at −10° C. to a solution of 2020 g of 1,4-butanediolmonovinylether and 160 ml of pyridine in 4000 ml of dry ethyl acetate. The suspension was stirred for 1 hour at 0° C. After filtration the solution was washed at 0° C. with water, and then with a 2% solution of sodium bicarbonate in water and brine. The organic phase was dried over magnesium sulphate, filtered and concentrated by evaporation. 325 g of crude compound was further purified by filtration over silicagel (4500 g) with dichloromethane. The filtrate was concentrated under reduced pressure. 253 g of pure compound I-2 was obtained (yield: 68%).

Ink Composition Examples and Ink Jet Experiments

Example 1

Free radical polymerization of non-colored inks

The general composition of the non-colored radiation curable inks of the invention is:

Ultra-violet polymerizing oligomer CN 501 (amine modified polyether acrylate, Cray Valley);

Monomer of the invention (see table 2); the numbering of the monomers corresponds to table 1 in the Detailed Description section, see above;

2-isopropylthioxanthone (Quantacure ITX, Rahn AG) as photoinitiator;

N-methyl diethanolamine (NMDA) as co-initiator or synergist; ethanol.

Substituting the monomer of the invention by the difunctional monomer dipropylene glycol diacrylate (Radcure DPGDA, UCB) as comparative diluent gave rise to a comparative ink composition.

All inks were prepared on a basis of a total final weight of 20 g. All ink compositions are indicated in table 2 in weight percentage:

all inks contained [2%] *5%* wt of NMDA, 2% wt of ethanol and 10% wt of Quantacure ITX. Finally, the Radcure DPGDA or monomer of the invention was added to the CN501. The resulting mixture was stirred for a couple of minutes until the added diluent was completely dissolved. As a third respectively a fourth ink component the liquid NMDA respectively the ethanol was added while stirring for about five minutes to complete the solution step. As the last compound the solid photoinitiator Quantacure ITX was added. The resulting mixture was stirred for about 1 hour in order to completely dissolve the ITX.

TABLE 2 ink composition of non-colored inks of the invention for free radical polymerization

| Ink number | Monomer of the invention (chem. nature) | wt % | wt % CN501 | wt % NMDA | wt % ethanol | wt % Quantacure ITX |
|---|---|---|---|---|---|---|
| 1-0 | **(comparative): DPGDA | 33.2 | 49.8 | 5.0 | 2.0 | 10.0 |
| 1-1 | 1.1 | 33.2 | 49.8 | 5.0 | 2.0 | 10.0 |
| 1-2 | 1.1 | 41.5 | 41.5 | 5.0 | 2.0 | 10.0 |
| 1-3 | 1.2 | 33.2 | 49.8 | 5.0 | 2.0 | 10.0 |
| 1-4 | 1.2 | 41.5 | 41.5 | 5.0 | 2.0 | 10.0 |
| 1-5 | 1.4 | 33.2 | 49.8 | 5.0 | 2.0 | 10.0 |
| 1-6 | 1.4 | 41.5 | 41.5 | 5.0 | 2.0 | 10.0 |
| 1-7 | 1.5 | 33.2 | 49.8 | 5.0 | 2.0 | 10.0 |
| 1-8 | 1.5 | 41.5 | 41.5 | 5.0 | 2.0 | 10.0 |

After measuring viscosities, each ink composition was coated repeatedly on a clear unsubbed 100 μm thick polyester film, using a bar coater and a 10 μm wired bar. The coated films were placed on a conveyer belt and transported underneath a UV lamp. A Fusion DRSE-120 conveyer, equipped with a Fusion VPS/I600 lamp (H bulb), powered at 60% and 100% of the nominal maximum input power, was used to cure the coated inks. Different transportation speeds are used for the same coated ink composition in order to determine the maximum speed at which curing was possible. The lowest belt speed that could be used with the conveyer was 9 m/min, the highest was 70 m/min. By means of a scratch test with a cotton bud, the curing was visually evaluated: when the coating did not remain visually unchanged after scratching, the curing was not complete. The highest curing speed was the highest transportation speed at which the coating remained unchanged after scratching. This maximum speed is indicated in table 3, together with the viscosities of the corresponding ink.

TABLE 3 free radical polymerization of ink compositions with the monomers of the invention

| Ink number | Viscosity (mPasec) | Maximum curing speed (m/min) when Power is: 60% of maximum P | 100% (= maximum P) |
|---|---|---|---|
| 1-0 **(compara.) | 24 | 50 | 70 |
| 1-1 | 10 | 9 | 12 |
| 1-2 | 7 | 5 | 12 |
| 1-3 | 12 | 9 | 15 |
| 1-4 | 10 | 9 | 15 |
| 1-5 | 13 | 12 | 20 |
| 1-6 | 8 | 9 | 15 |
| 1-7 | 12 | 12 | 20 |
| 1-8 | 11 | 9 | 12 |

As one can see from table 3, all inks wherein the comparative DPGDA was replaced by a monomer of the invention showed a much lower viscosity of the radiation curable ink, and curing of these inks was still possible using conventional UV curing systems. The lower viscosity is of utmost importance if one wants to use these inks in ink jet printheads.

Example 2

Free Radical Polymerization of Black Inks

The general composition of the black colored radiation curable inks of the invention was:

Ultraviolet polymerizing oligomer CN 501 (amine modified polyether acrylate, Cray Valley)

Monomer of the invention (see table 4),

N-methyl diethanol amine (NMDA as co-initiator or synergist Ethanol 2-isopropylthioxanthone (Quantacure ITX, Rahn AG)

Special black 250 (Degussa)

Solpserse 24000SC (Zeneca)

Substituting the monomer of the invention by the difunctional monomer dipropylene glycol diacrylate (Radcure DPGDA, UCB) as comparative diluent gave rise to a comparative ink composition. All inks were prepared on a basis of a total final weight of 20 g. All ink compositions are indicated in table 3 in weight percentage: they all contained [2%] *5%* wt of NMDA, 2% wt of ethanol and 10% wt of Quantacure ITX.

Firstly, the Radcure DPGDA or monomer of the invention was added to the CN501. The resulting mixture was stirred for a couple of minutes until the added diluent was completely dissolved. As a third ink component—10 wt % admixture of Solsperse 24000SC in CN501 —was added while stirring for about five minutes to complete the solution step. After further adding the Special Black, the resulting ink was milled for 24 hour in a ball mill. Furtheron the NMDA and the ethanol were added, and the resulting mixture was stirred for about 5 minutes. As the last compound the solid photoinitiator Quantacure ITX was added. The resulting mixture was stirred for about 1 hour in order to completely dissolve the ITX. The ink compositions that have been tested are given in table 4.

TABLE 4 ink composition of black colored inks of the invention for free radical polymerization

| Ink number | Monomer of the invention (chem. nature) | wt % | wt % CN501 | wt % NMDA | wt % ethanol | wt % solsperse 24000CS | wt % Special Black 250 | wt % Quantacure ITX |
|---|---|---|---|---|---|---|---|---|
| 2-0 | **(comparative): DPGDA | 28.2 | 49.05 | 5.0 | 2.0 | 0.75 | 5.0 | 10.0 |
| 2-1 | 1.1 | 28.2 | 49.05 | 5.0 | 2.0 | 0.75 | 5.0 | 10.0 |
| 2-2 | 1.2 | 28.2 | 49.05 | 5.0 | 2.0 | 0.75 | 5.0 | 10.0 |
| 2-3 | 1.4 | 28.2 | 49.05 | 5.0 | 2.0 | 0.75 | 5.0 | 10.0 |
| 2-4 | 1.5 | 28.2 | 49.05 | 5.0 | 2.0 | 0.75 | 5.0 | 10.0 |

After the viscosities had been measured, each ink composition was treated similarly as the inks described in example 1: barcoating, curing at different belt speed and determining the maximum curing speed. Results of the experiments are given in table 5.

TABLE 5

| free radical polymerization of black ink compositions with the monomers of the invention | | |
|---|---|---|
| Ink number | Viscosity (mPasec) | Maximum curing speed (m/min) at 100% power |
| 2-0 **(compar.) | 58 | 40 |
| 2-1 | 28 | 20 |
| 2-2 | 32 | 20 |
| 2-3 | 32 | 20 |
| 2-4 | 35 | 20 |

As can be seen from table 5, all black inks wherein the comparative DPGDA was replaced by a monomer of the invention showed up a much lower viscosity of the radiation curable ink, and curing of these inks was still possible using conventional UV curing systems. The lower viscosity is of utmost importance if one wants to use these inks in ink jet printheads.

Example 3

Cationic Polymerization of Non-Colored Inks

The general composition of the non-colored radiation curable inks of the invention was:

Ultra-violet: polymerizing base epoxidle resin UTVR6105 (3,4 epoxycyclohexylmethyl 3, 4 epoxycyclohexane carboxylate; Union Carbide Corporation);

Monomer of the invention (see table 6);

ethanol;

UV 9380 C: according to the MSDS of GE Silicones: a mixture of 1–5 wt % of 2-isopropylthioxanthone, 30–60 wt % C12 & C14 alkylglycidylethers, 30–60 wt % bis (4-dodecylphenyl) iodoniumhexafluoroantimonate, 5–10 wt % linear alkylate dodecylbenzene.

Substituting the monomer of the invention by the monofunctional epoxide UV 6216 (1,2 epoxyhexadecane) as comparative diluent gave rise to a comparative ink composition.

All inks were prepared on a basis of a total final weight of 20 g. All ink compositions are indicated in table 6 in weight percentage: they all had 2% wt of ethanol and 10% wt of UV 9380C. Firstly, the UVR6216 or monomer of the invention was added to the W VR6105. The resulting mixture was stirred for a couple of minutes until the added diluent was completely dissolved. As a second ink component the ethanol was added while stirring for about five minutes to complete the solution step. As the last compound the photoinitiator UV9380C was added. The resulting mixture was stirred for about 1 hour in order to completely dissolve the photoinitiator.

TABLE 6

| ink composition of non-colored inks of the invention for cationic polymerization | | | | | |
|---|---|---|---|---|---|
| Ink | Monomer of the invention | | wt % | wt % | wt % UV |
| number | chem. nature | wt % | UVR6105 | ethanol | 9380C |
| 2-0 | **comp. UVR6216 | 35.2 | 52.8 | 2.0 | 10.0 |
| 2-1 | 1.1 | 35.2 | 52.8 | 2.0 | 10.0 |

TABLE 6-continued

| ink composition of non-colored inks of the invention for cationic polymerization | | | | | |
|---|---|---|---|---|---|
| Ink | Monomer of the invention | | wt % | wt % | wt % UV |
| number | chem. nature | wt % | UVR6105 | ethanol | 9380C |
| 2-2 | 1.2 | 35.2 | 52.8 | 2.0 | 10.0 |
| 2-3 | 1.4 | 35.2 | 52.8 | 2.0 | 10.0 |
| 2-4 | 1.4 | 44.0 | 44.0 | 2.0 | 10.0 |
| 2-5 | 1.5 | 35.2 | 52.8 | 2.0 | 10.0 |
| 2-6 | 1.5 | 44.0 | 44.0 | 2.0 | 10.0 |

After the viscosities were measured each ink composition was treated similarly as the inks described in example 1: barcoating, curing at different belt speed and determining the maximum curing speed. Results of the experiments are given in table 7.

TABLE 7

| cationic polymerization of ink compositions with the monomers of the invention | | | |
|---|---|---|---|
| | | Maximum curing speed (m/min) when Power is: | |
| Ink number | Viscosity (mPasec) | 60% of maximum P | 100% (= maximum P) |
| 2-0 **(compara.) | 22 | 70 | 70 |
| 2-1 | 12 | 30 | 70 |
| 2-2 | 13 | 50 | 70 |
| 2-3 | 16 | 30 | 70 |
| 2-4 | 12 | 30 | 70 |
| 2-5 | 17 | 50 | 70 |
| 2-6 | 13 | 30 | 70 |

As one can see from table 7, all inks wherein the comparative UVR6216 was replaced by a monomer of the invention showed a much lower viscosity of the radiation curable ink, and excellent curing of these inks was still possible using conventional UV curing systems. The lower viscosity is of utmost importance if one wants to use these inks in ink jet printheads.

Example 4

Cationic Polymerization of Black Colored Inks

The general composition of the black colored radiation curable inks of the invention was:

Ultraviolet polymerizing base epoxide resin UVR6105(3,4 epoxycyclohexylmethyl 3,4 epoxycyclohexane carboxylate; Union Carbide Corporation)

Monomer of the invention (see table 8)

Ethanol

UV 9380 C: according to the MSDS of GE Silicones: a mixture of 1–5 wt % of $^{2}$-isopropylthioxanthone, 30–60 wt % C12 & C14 alkylglycidylethers, 30–60 wt % bis (4-dodecylphenyl) iodoniumhexafluoroantimonate, 5–10 wt % linear alkylate dodecylbenzene Special black 250 (Degussa)

Admixture of 10 wt % Solpserse 24000SC (Zeneca) in UVR6216

Substituting the monomer of the invention by the monofunctional epoxide UVR 6216 (1,2 epoxyhexadecane) as comparative diluent gave rise to a comparative ink composition.

All inks were prepared on a basis of a total final weight of 20 g. All ink compositions are indicated in table 8 in weight percentage: they all contained 2% wt of ethanol and 10% wt of UV 9380C.

Firstly, the UVR6216 or monomer of the invention was added to the UVR6105. The resulting mixture was stirred for a couple of minutes until the added diluent was completely dissolved. As a third ink component, an admixture of 10 wt % SOLSPERSE 24000SC in UVR 6216, was added while stirring for about five minutes. After further adding the Special Black, the resulting ink was milled for 24 hour in a ball mill. As the last compound the photoinitiator UV9380C was added. The resulting mixture was stirred for about 1 hour in order to completely dissolve the photoinitiator.

TABLE 8

| | ink composition of black colored inks of the invention for cationic polymerization | | | | | | |
|---|---|---|---|---|---|---|---|
| | Monomer of the invention | | | wt % | wt % Special | | wt % |
| Ink number | (chemical) nature | wt % | wt % UVR6105 | Solsperse 24000SC | Black 250 | wt % ethanol | UV 9380C |
| 4-0 | **(comparative) UVR6216 | 30.2 | 45.3 | 0.75 | 5.0 | 2.0 | 10.0 |
| 4-1 | 1.1 | 30.2 | 45.3 | 0.75 | 5.0 | 2.0 | 10.0 |
| 4-2 | 1.2 | 30.2 | 45.3 | 0.75 | 5.0 | 2.0 | 10.0 |
| 4-3 | 1.4 | 30.2 | 45.3 | 0.75 | 5.0 | 2.0 | 10.0 |
| 4-5 | 1.5 | 30.2 | 45.3 | 0.75 | 5.0 | 2.0 | 10.0 |

Again, as in example 2 for the black colored inks for free radical polymerization, the viscosities were measured, and each ink composition was treated similarly as the inks already described in the foregoing examples. Results of the experiments are given in table 9.

TABLE 9

| *Cationic* [free radical] polymerization of black ink compositions with the monomers of the invention | | |
|---|---|---|
| Ink number | Viscosity (mPasec) | Maximum curing speed (m/min) at 100% power |
| 4-0 **(compar.) | 24 | 40 |
| 4-1 | 18 | 40 |
| 4-2 | 21 | 40 |
| 4-3 | 23 | 30 |
| 4-4 | 22 | 30 |

Although the differences in viscosity are not as big as in the clear inks—mainly as a result of the addition of a black colored pigment, leading to an overall higher viscosity—it can be seen from table 9 that introduction of the monomers of the present invention resulted in a lower viscosity. Curing of the inks was still possible using conventional UV curing systems.

What is claimed is:

[1. An ultraviolet curable ink composition for ink jet printing comprising an ultraviolet curable monomer represented by the following general formula I:

(I)

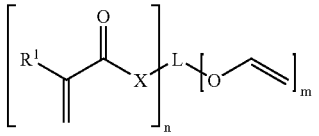

wherein, $R^1$ represents hydrogen, or a substituted or unsubstituted alkyl group, L represents a linking group, wherein the linking group is an aliphatic chain of at least three carbon atoms, X represents O, S or $NR^2$ wherein $R^2$ has the same meaning as $R^1$; when $X=NR^2$, L and $R^2$ may form together a ring system, m and n independently represent a value from 1 to 5.]

[2. Ultraviolet curable ink composition for ink jet printing according to claim 1 wherein said composition further contains a colorant.]

[3. Ultraviolet curable ink composition for ink jet printing according to claim 2 wherein said colorant is a dispersed pigment.]

[4. Ultraviolet curable ink composition for ink jet printing according to claim 3 wherein said pigment is chosen from the list consisting of Pigment Yellow 128, 93, 17, 74, 138, 139, 154, 180, 185; Pigment Red 122, 57:1, 184; Pigment Blue 15:3, Pigment Blue 15:4 and carbon black.]

[5. Ultraviolet curable ink composition for ink jet printing according to claim 1 wherein said composition further contains a photoinitiator or a mixture of photoinitiators.]

[6. Ultraviolet curable ink composition for ink jet printing according to claim 5 wherein said composition further contains an initiator synergist.]

[7. Ultraviolet curable ink composition for ink jet printing according to claim 1 wherein said ink composition further contains a second photopolymerizable monomer, oligomer or prepolymer and the monomer represented by formula (I) serves as reactive diluent.]

[8. Ultraviolet curable ink composition for ink jet printing according to claim 7 wherein said second monomer is selected from the group consisting of the following chemical classes: an amino modified polyether acrylate, a cycloaliphatic epoxy compound, an urethane acrylate, a polyester acrylate, a polyether acrylate, and an epoxy acrylate.]

[9. Ultraviolet curable ink composition for ink jet printing according to claim 1 wherein the viscosity of said ink composition is comprised between 1 and 75 mPa.s at 25° C.]

[10. Ultraviolet curable ink composition for ink jet printing according to claim 1 further comprising a dendrimer.]

[11. Process for obtaining a monochrome or multicolor ink jet image comprising jetting one or more streams of ink droplets having a composition according to any one of the previous claims to a receiver element, and subjecting the obtained image to ultraviolet curing.]

[12. Process according to claim 11 wherein said ultraviolet curing is performed by means of one or more ultra-violet sources.]

*13. An ultraviolet curable ink composition for ink jet printing comprising a free radical photoinitiator, an amine*

*co-initiator and a radiation curable monomer represented by formula I:*

(I)

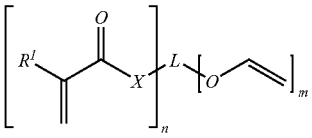

*wherein,*

$R^1$ *represents hydrogen, or a substituted or unsubstituted alkyl group,*

*L represents a linking group,*

*X represents O, S or* $NR^2$ *wherein* $R^2$ *has the same meaning as* $R^1$*; when X=*$NR^2$*, L and* $R^2$ *may form together a ring system,*

*m and n independently represent a value from 1 to 5, characterized in that said radiation-curable monomer represented by said formula I is selected from the group consisting of:*

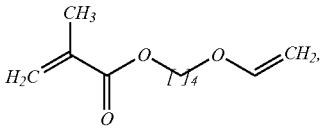

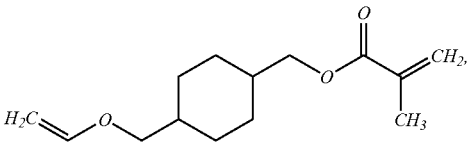

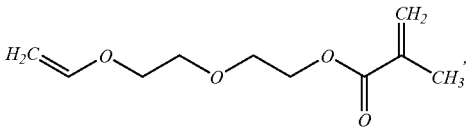

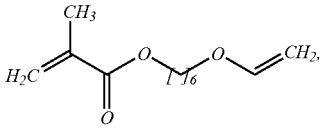

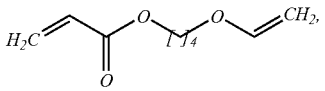

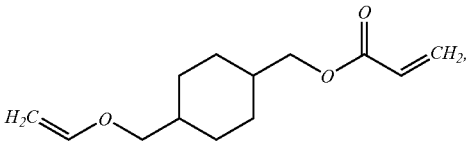

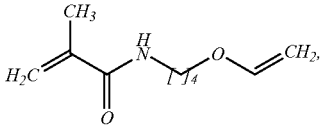

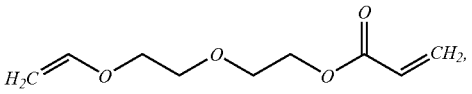

-continued

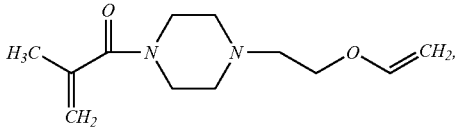

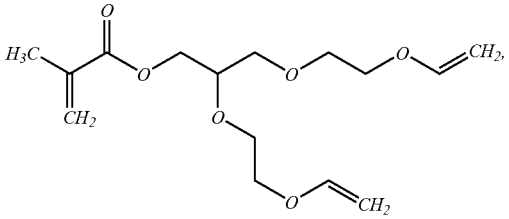

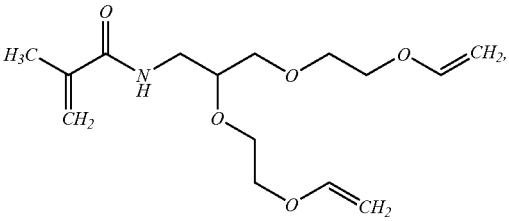

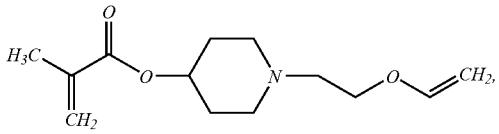

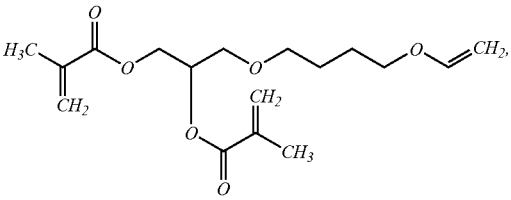

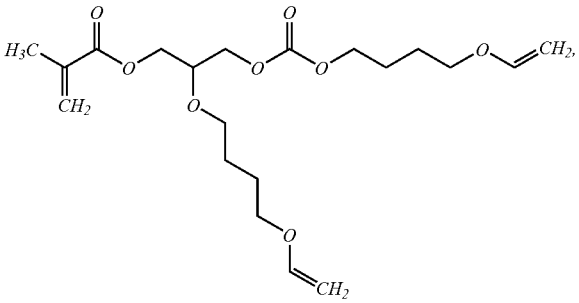

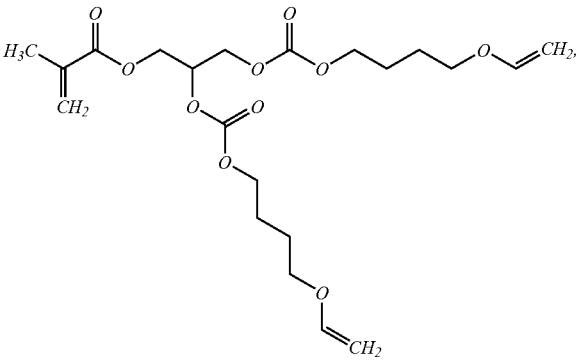

-continued

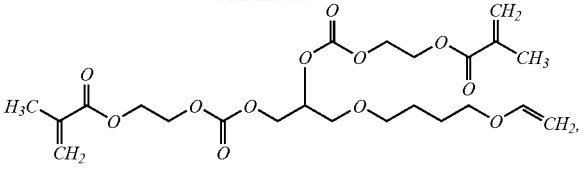

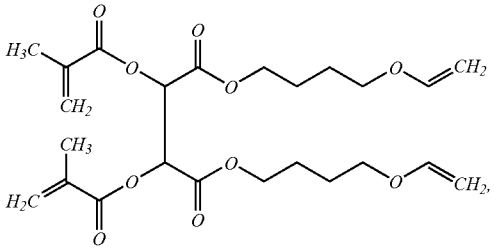

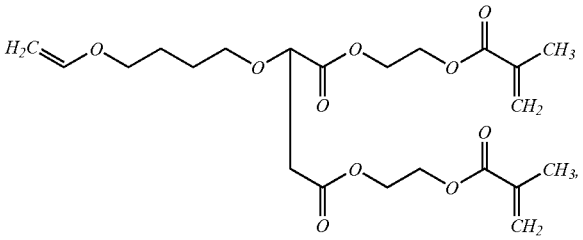

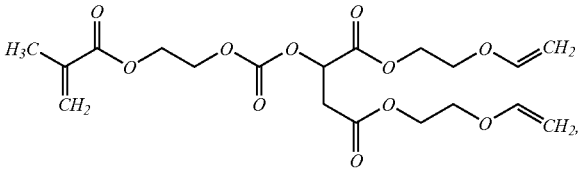

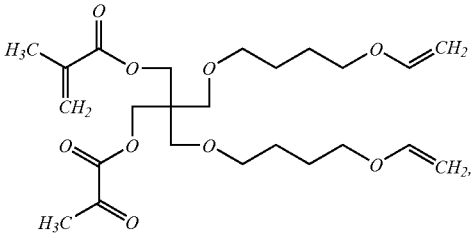

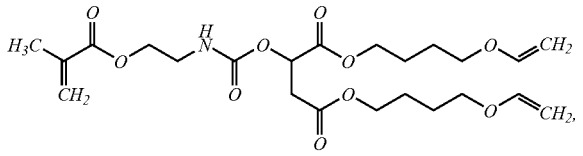

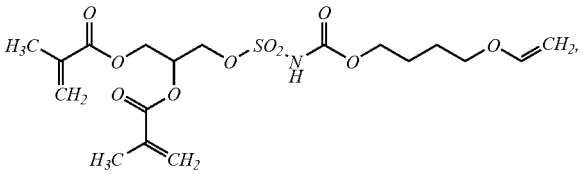

*and*

-continued

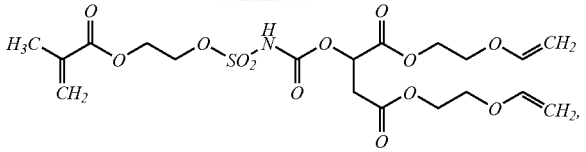

*and*

*wherein the viscosity of said ink composition is between 1 and 75 mPa.s at 25° C.*

*14. Ultraviolet curable ink composition according to claim 13, wherein said composition further contains a colorant.*

*15. Ultraviolet curable ink composition according to claim 14, wherein said colorant is a dispersed pigment.*

*16. Ultraviolet curable ink composition according to claim 15 wherein said pigment is chosen from the list consisting of Pigment Yellow 128, 93, 17, 74, 138, 139, 154, 180, 185; Pigment Red 122, 57:1, 184; Pigment Blue 15:3, Pigment Blue 15:4 and carbon black.*

*17. Ultraviolet curable ink composition according to claim 13, wherein said composition contains a mixture of photoinitiators.*

*18. Ultraviolet curable ink composition according to claim 13, wherein said ink composition further contains a second photopolymerizable monomer, oligomer or prepolymer and the monomer represented by formula (I) serves as reactive diluent.*

*19. Ultraviolet curable ink composition according to claim 18, wherein said second monomer is chosen from the group consisting of following chemical classes: an amino modified polyether acrylate, a cycloaliphatic epoxy compound, an urethane acrylate, a polyester acrylate, a polyether acrylate, and an epoxy acrylate.*

*20. Ultraviolet curable ink composition according to claim 13, wherein said radiation curable ink composition further comprising a dendrimer.*

*21. Ultraviolet curable ink composition according to claim 13, wherein the co-initiator is aminobenzoate co-initiator.*

*22. Ultraviolet curable ink composition according to claim 13 wherein the photoinitiator is copolymerizable.*

*23. Process for obtaining multicolour ink jet image comprising the steps of jetting one or more streams of ink droplets having a composition according to claim 13 to a receiver element, and subjecting the obtained image to radiation curing.*

* * * * *